United States Patent [19]

Abdelmalek

[11] Patent Number: 5,607,011
[45] Date of Patent: Mar. 4, 1997

[54] REVERSE HEAT EXCHANGING SYSTEM FOR BOILER FLUE GAS CONDENSING AND COMBUSTION AIR PREHEATING

[76] Inventor: Fawzy T. Abdelmalek, 12807 Willowyck Dr., St. Louis, Mo. 63146

[21] Appl. No.: 251,322

[22] Filed: May 31, 1994

Related U.S. Application Data

[63] Continuation-in-part of Ser. No. 645,804, Jan. 25, 1991, Pat. No. 5,146,755, and a continuation-in-part of Ser. No. 754,035, Sep. 3, 1991, Pat. No. 5,133,190, and a continuation-in-part of Ser. No. 977,138, Nov. 16, 1992, Pat. No. 5,321,946, and a continuation-in-part of Ser. No. 11,870, Feb. 1, 1993, Pat. No. 5,403,569.

[51] Int. Cl.⁶ ............................ F28D 15/00; F01K 25/14
[52] U.S. Cl. ...................... 165/104.14; 165/921; 60/648; 60/655; 423/242.7; 423/242.1; 423/220; 423/243.01
[58] Field of Search .................. 165/921, 104.14, 165/913; 60/648, 655; 423/242.1, 242.7, 220, 243.01

[56] References Cited

U.S. PATENT DOCUMENTS

| | | | |
|---|---|---|---|
| 4,476,922 | 10/1984 | Heilig, Jr. et al. | 165/104.14 |
| 4,616,697 | 10/1986 | Kotaka | 165/921 |
| 5,122,352 | 6/1992 | Johnson | 165/921 |
| 5,198,201 | 3/1993 | Johnson | 165/921 |

FOREIGN PATENT DOCUMENTS

| | | | |
|---|---|---|---|
| 0002889 | 1/1985 | Japan | 165/104.14 |
| 0217694 | 9/1986 | Japan | 165/104.14 |
| 0252493 | 11/1986 | Japan | 165/104.14 |
| 0252492 | 11/1986 | Japan | 165/104.14 |

*Primary Examiner*—John K. Ford
*Attorney, Agent, or Firm*—Veo Peoples, Jr.

[57] ABSTRACT

A condensing heat exchanger for removing acidic vapors and recovering residual waste heat energy normally rejected into the atmosphere from a fossil fueled boiler flue gas stream, wherein the waste heat energy in the boiler flue gas is recovered by multiple evaporative and condensing heat exchangers and by a heat pump refrigeration system to recover heat energy from the flue gas stream and to preheat the boiler combustion air stream and boiler feed water stream.

4 Claims, 2 Drawing Sheets

REVERSE HEAT EXCHANGING SYSTEM FOR BOILER FLUE GAS CONDENSING AND COMBUSTION AIR PREHEATING

RELATIONSHIP TO OTHER PATENT APPLICATIONS

This application constitutes a continuation in part of my U.S. patent applications Ser. No. 645,804 filed Jan. 25, 1991, now U.S. Pat. No. 5,146,755; Ser. No. 754,035 filed Sep. 3, 1991, now U.S. Pat. No. 5,133,190; Ser. No. 977,138 filed Nov. 16, 1992, now U.S. Pat. No. 5,321,946, and Ser. No. 011,870 filed Feb. 1, 1993, now U.S. Pat. No. 5,403,569.

BACKGROUND OF THE INVENTION

1. Field of the Invention

The present invention is a continuation in part of my U.S. patent applications Ser. Nos. 645,804; 754,035; 977,138 and 011,870 in which I disclosed methods for a boiler flue gas cleaning utilizing a step of cooling and condensing processes to remove its acidic water vapor and trace heavy metal vapors prior to separation of sulfur dioxide and carbon dioxide gases by thermodynamic equilibria and liquefaction processes. More particularly it relates to a reversible heat exchanger system where latent and sensible heat energy contained in the boiler flue gas stream is recovered and transferred to pre-heat a combustion air stream. Evaporative fluids circulating in closed heat exchanging circuits are employed to transfer heat energy between the relatively hot flue gas stream and the relatively cold combustion air stream.

A relatively hot flue gas stream flowing from a boiler at above 270° F. is conducted to enter a flue gas cooling and condensing structure where the flue gas stream is cooled through several evaporator heat exchangers, as the flue gases flow on the outside of relatively colder extended metal surfaces of the evaporator heat exchanger, part of the water vapor contained in the flue gas condenses at temperature below the dew point of the flue gases.

While the flue gas acidic and hazardous vapors are condensed, a working evaporative fluid is heated and evaporated, then conducted to a corresponding condenser heat exchanger to give up the recovered heat energy to a combustion air stream; while the combustion air stream is heated, the saturated vapor of the working evaporative fluid is cooled and condensed then returned back to the evaporator heat exchanger.

2. Description of the Prior Art

In the present invention the latent heat capacity of a working evaporative fluid contained in at least one closed heat exchanging circuit is employed to effectively transfer and exchange heat energy between a relatively hot boiler flue gas stream and a relatively cold combustion air stream. Working evaporative fluids employed for the purpose of this invention are characterized to provide relatively low boiling and low condensing operating temperatures. The sensible and latent heat energy contained in the flue gas stream flowing on the outside surfaces of an evaporator heat exchanger is recovered to effect cooling the flue gases, and to condensing water vapor contained therein, while heating and evaporating the working fluid to a saturated vapor state. The saturated vapor of the working fluid is then conducted to give up heat to a combustion air stream in a condenser heat exchanger, while the combustion air is heated up to a relatively higher temperature, the vapor of the working fluid is condensed and recycled back to the flue gas cooling heat exchanger.

In the present invention the latent heat of evaporation of an evaporative working fluid provides larger heat transfer rate when compared to the prior art where lower heat transfer is limited by the heat exchanger metal conductance heat transfer capacity.

In the prior art, thermal storage rotating wheels, heat pipe heat exchangers, and plate type heat exchangers are used for combustion air preheating at higher dry temperature regions above the dew temperature point of the vapors contained in the flue gas stream. The present invention offers flue gas condensing heat exchanging system operating at much lower moist temperature regions, characterized to have high heat transfer rate, smaller heat exchanger surface area per unit of heat energy transferred, lower maintenance cost, lower capital cost, and economical cleaning of the heat exchanger elements. The present invention provides the flexibility to employ multiple evaporative heat transfer working fluids operating at adjustable pressures and temperatures to maximize the total heat transfer rate of the heat exchanging system.

In the condenser; the saturated vapor of a working fluid gives up heat to a combustion air stream and condenses over most of the heat exchanger length from a 100% vapor saturation state to 0% vapor. A temperature drop in a two phase flow results in a progressive pressure drop enhancing the vapor condensation rate. The thermal fluid condensate is further subcooled by the relatively colder combustion air, and the condensate is then pumped back to the evaporator side. In the evaporator; the evaporative working fluid is heated and evaporated to a saturation state. The evaporation occurs over most of the heat exchanger length from 100% liquid to 0% liquid state. A temperature increase in a two phase flow results in a progressive pressure increase to a point slightly above the saturation pressure and the 100% evaporation point before entering the condenser coil. Size and configuration of heat exchanger coils in each temperature zone will vary to satisfy the heat transfer rate, and the temperature differences between the flue gas stream and the evaporative working thermal fluid. Similar to the prior art; the evaporator and condenser heat exchangers may have multipath tubing arranged in serpentine fashion running perpendicular to the flue gas or combustion air flow. Tubes may be arranged in staggered rows to equilateral triangles, and parallel flow paths may be arranged to form regions of symmetry across the heat exchanger. Distributer headers connecting each circuit to ensure equal flow through the heat exchanger coils. The two phase in-tube evaporation and condensation process result in a higher heat transfer coefficient and require a smaller heat transfer surface and higher exchange capacity.

Condensing furnaces are commercially available for residential and commercial air heating systems, the flue gas stream is cooled through a non corrosive aluminized steel heat exchanger where corrosive water vapor in the flue gas stream is condensed while its sensible and latent heat is recovered to pre-heat a recirculating room air stream. The present invention provides a high efficiency condensing heat exchanging system employing evaporative working fluids to cool a flue gas stream and to preheat a boiler combustion air stream, while cleaning the flue gas stream by condensing its acidic water vapor and removing other toxic and hazardous trace heavy metal vapors contained therein. The disclosed reverse heat exchanging system when employed for a boiler flue gas condensing and combustion air preheating will achieve a substantially higher heat recovery, cleaning the flue gas stream and reducing the heat rate of producing electric power. The recovery of more energy when increased excess air is required, and cleaning of more hazardous trace heavy metal vapors including dioxin from the flue gases emitting from incineration and bio-mass burning facilities will provide sound economics for the present invention.

The theory and practice of flue gas heat recovery heat pipe heat exchangers are well known for recovering and utilizing heat from hot flue gas stream in the dry gas temperature range between 500° F. and 300° F. to avoid condensation of acidic vapors, examples are disclosed in U.S. Pat. No. 4,616,697 by Kotaka, in foreign patent (Japan) document 60-2889 by Koutaka for a heat pipe heat exchanger device, and in document 61-217694 by Iwabuchi for a heat pipe type exchanger. However heat pipe heat exchangers are constructed from multiple sealed pipes, each contains evaporative fluid which evaporates at one end and condenses at the other end of the heat pipe. Heat pipes have internal wick and must be installed in tilted position from the horizontal to allow condensed fluid to flow by gravity to the evaporator end of the heat pipe. The working fluid normally disintegrate over a five to seven year period of time and require heat pipe replacement that become very expensive.

It is further acknowledged by the present applicant that there are some instances where it is known that heat exchangers were connected by pipe work for circulation of working fluid or refrigerant between them by pumping the condensed refrigerant from the cooler of the heat exchangers to the warmer heat exchanger; for example, in U.S. Pat. No. 4,476,922 by Heilig disclosed a heat exchanger system for recovering heat from an exhaust air stream for a work place application in commercial and industrial buildings, where the working place air temperature range is within the ambient temperature range. However this is an application in connection with a clean environmental air and the same objectives and problems of flue gas cleaning or preheating of boiler combustion air and feed water streams do not exist.

In U.S. Pat. Nos. 5,122,352 and 5,198,201 by Johnson disclose a method and apparatus for removing pollutants in a series of heat exchanger steps to cool the flue gas to above 200° F. and to condense acidic vapor by indirect heat exchanger between the flue gas and boiler feed water. However this is an application in connection with extraction of sulphurous acid using chemical reaction between extracted sulfur dioxide gas stream and metallic iron bed to produce ferrous sulfite. The same objectives and the process of cleaning the flue gas by cooling to below ambient conditions and recovery of the flue gas heat energy to preheat the boiler combustion gas stream and boiler feed water using evaporative and condensing fluids heat exchangers as described in my application are not disclosed or discussed by the Johnson's process.

The use of temperature controls as described for this application is necessary for the proper operation of a high efficiency heat exchange system of this type. The theory and practice of temperature control systems has been used in the past in similar applications where a need to adjust the mass flow rates of a working heat transfer fluid that circulates between two heat exchangers to respond to deviations in the mass flow rate and temperature of an exhaust gas stream and incoming fresh air stream. Example of such system is disclosed by Hirayama in foreign patent (Japan) documents 61-252492 and 61-252493.

SUMMARY OF THE INVENTION

Figure 1:
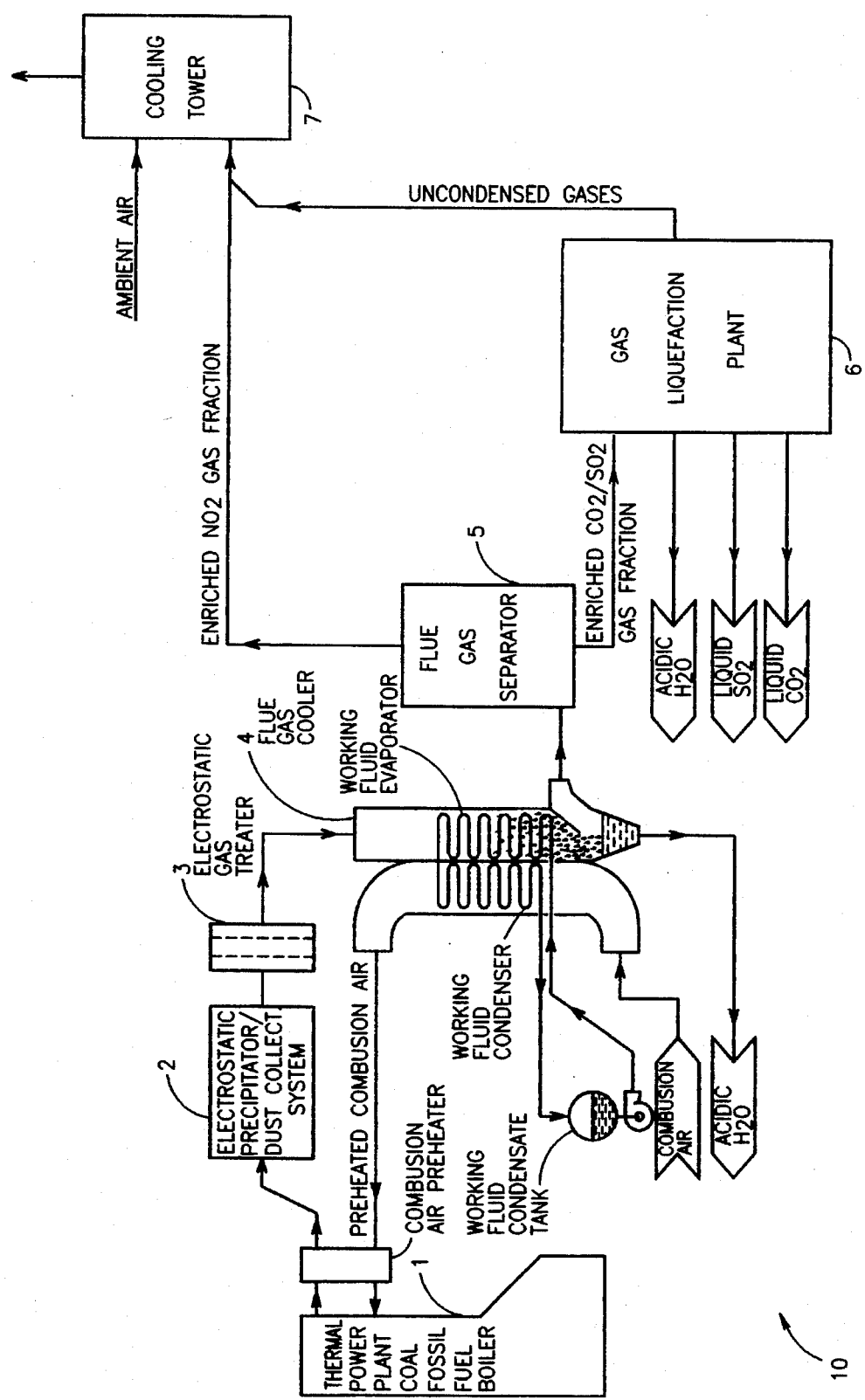
FIG. 1: Indicates a schematic flow diagram for a boiler flue gas cleaning system employing an evaporative working fluid heat exchanger for a flue gas stream cooling and condensing and combustion air stream preheating.

It is therefore a principle object of the present invention to provide an improved flue gas cleaning while conserving low temperature heat energy otherwise wasted into the atmosphere to pre-heat a combustion air stream.

It is further a principle object of the present invention to provide a condensing reversible heat exchanger which employs active evaporative working fluids in closed circuits, to cool and condense most of the acidic vapors emitted from a boiler flue gas stream while recovering its sensible and latent heat to preheat a boiler combustion air stream.

It is further an object of the present invention to remove most of the hazardous acidic water vapors and trace heavy metal vapors contained in a flue gas stream by cooling and condensing processes.

It is further an object of the present invention to conserve energy, improve efficiency, and reduce heat rate of fossil fueled power plants while cleaning the flue gas stream.

The above, and other objectives and advantages of the present invention will become apparent from the following specifications, drawings, and claims. It will be understood that particular embodiments of the invention are shown by way of illustration only and are not as limitations of the invention. The principle features of this invention, may be employed in various embodiments without departure from the scope of the invention.

DETAILED DESCRIPTION OF THE PRESENT INVENTION

When a boiler flue gas stream is cooled, part of the nitric oxide gas (NO) is oxidized and dissolved in water to form weak nitric acid ($HNO_3$), part of the sulfur dioxide ($SO_2$) is oxidized and dissolved in water to form sulfurous acid ($HSO_3$). In the presence of trace metal species, countercurrent, and consecutive reactions take place, and result in forming dilute sulfuric acid, and metal sulfate and sulfite compounds, which end up in the water vapor condensate stream, and can be treated and properly disposed.

In the present invention, a flue gas stream flowing from a boiler is cooled, most of its acidic water is condensed, its sensible and latent heat is exchanged in a reversible heat exchanger to preheat a combustion air stream by employing active evaporative working fluids in closed circuits. As the heat transfer heat exchanging system operates, there are six interdependent transfer processes that occur simultaneously:

a. Sensible and latent heat is transferred by conduction from the flue gas through the pipe wall of the evaporator coil;

b. Working fluid is vaporized and the latent heat of vaporization by heat transferred from the inner surface of the evaporator coil;

c. Saturated vapor flows from the evaporator coil to the condenser coil;

d. Vapor of the working fluid condenses and gives up the latent heat of vaporization;

e. Heat is transferred by conduction from the condenser surface through the pipe wall to the combustion air;

f. The condensate liquid of the working fluid flows from the condenser coil to an accumulator tank and recycled back by a recirculating pump.

The primary driving force for the evaporative working fluid heat exchanger is the temperature difference between the flue gas stream as a heat source and the combustion air stream as a heat sink, the vapor pressure gradient of the evaporative fluid is normally very small and consequently, the evaporation—condensation process inside the reverse heat exchanger loop is essentially isothermal.

The heat transfer process at the condenser section is a much simpler phenomenon than that at the evaporator. The vapor is condensed at the inner surface of the pipe giving up its latent heat of vaporization which is conducted through the pipe wall, the conduction temperature drop results in sub-cooling of the liquid.

A recirculating pump provides the pressure gradient required for the liquid to flow in a pipe from the condenser to the evaporator. For a maximum heat transfer rate between the evaporator and the condenser, the pressure gradient and temperature drop between the evaporator and the condenser must be as small as possible accordingly more than one working fluid, and evaporator-condenser circuits will be required.

A good evaporative heat transfer working fluid will have high latent heat, high vapor and liquid densities, low vapor and liquid viscosities and thermophysical properties suitable for the working temperature range of the evaporation and condensation processes.

The type and thermodynamic characteristics of the working fluids will vary with the application and the temperature range. In the present invention water is a preferred fluid for temperatures above 200° F., (hydrocarbon organic based refrigerant, freon or alike) is a preferred fluid for temperatures between 160° F. and 200° F. and ammonia is a preferred working fluid for relatively lower temperatures between 100° F. and 160° F., and a variety of refrigerant fluids may be used for the flue gas sub cooling by heat pumping to a low temperature near or below the surrounding ambient temperature. In the present invention the evaporative fluid acts like a high conductance heat conductor with a high heat transfer rate and a small temperature gradient. The heat transfer capability of the evaporator and condenser heat exchangers is a function of the working fluid thermodynamic property, the pipe material, cross sectional geometry, and the extended metal fins design.

Evaporator coils consists of plate finned tubes with evaporative fluid or refrigerant flowing on the inside of the tubes and flue gas flowing over the outer tube surface. The tubes may be finned in a continuous manner by using flat plates installed with densities range of 4 to 8 fins per inch to allow coil washing and cleaning. Increased heat transfer rate can be enhanced by one of well known techniques to include internal rough surfaces, helical wire inserts, corrugated surfaces or microfins. The pressure drop in the evaporator and the condenser tubes must be kept to a minimum because of the detrimental effect on the evaporation and condensing temperature of the evaporative fluid.

Where the evaporator coil surface temperature is reduced below the dew point temperature of the flue gas, water vapor is condensed on the outside surfaces of the coil, under these circumstances, the flue gas side surface of the coil is referred to as wet coil or moist coil. Under these circumstances the evaporator coil serves a dual function for both cooling and dehumidifying the flue gas, and depending on the thermodynamic equilibrium point of the humidity contained in the flue gas, a part or all the coil is wetted. The presence of moisture in the flue gas affects heat transfer in three ways, first; the condensing moisture enhances convective heat transfer from the flue gas to the fin surfaces, this enhancement is most likely due to the moisture layer creating an uneven or rough surface on the smooth fin surface. Second; the presence of a water layer on the fin surface adds another thermal resistance to the heat transfer path, but since the thermal resistance due to the water fluid is small, this may have only small effect on the total heat transfer rate. Third; because heat transfer also occurs as a result of moisture migration and subsequent condensation on the coil surface, the water vapor concentration is also a driving potential for heat transfer.

Several similarities exist between evaporator coils and condenser coils, however, because the evaporator coils are used to cool flue gases and condense acidic water vapor, they must be constructed for non corrosive materials.

In the prior art, in order to avoid water vapor condensation and corrosion of the metal surfaces used in the construction of the flue gas release structures and equipment, the temperature of the boiler flue gases must be released above 270° F. Completed research and development work indicated that a combination of high corrosion resistant or coated materials, and intermittent high pressure steam or water coil cleaning systems, will result in lesser corrosion rates when compared with corrosion rates observed at higher flue gas temperatures presently maintained in power plants. In the present invention continuous coil washing by the water condensate and washing by the an intermittent coil cleaning system will provide an extended life cycle for the condensing heat exchanger metal elements and structure.

OPERATION

FIG. 1 indicates a schematic block diagram for a boiler flue gas cleaning system 10. The flue gases flowing from a boiler, incinerator or other fossil fuel burning facility 1, is received after removing its particulate matter in an electrostatic precipitator, or a dust collector 2, then conducted to enter an electrostatic gas treater 3, where the electromagnetic charges of its ultra-fine submicron particulate matter is neutralized to enhance coagulation of the particles, and prevent its adherence to the metallic surfaces of the heat exchanger elements. The treated gas enters the gas cooler 4, where its temperature is reduced to near or below the ambient temperature. Condensation of vapors 2 contained in a relatively higher temperature flue gas stream will occur on the metal outside surfaces of the heat exchanger at temperatures below the dew point of the condensing vapor, even at gas temperatures higher than the flue gas vapor dew point, condensation will occur at the relatively colder metal surfaces of the heat exchanger. The evaporative fluid heat exchanger structure is divided into three cooling and condensing zones; a high temperature zone where the condensing temperature is above 200° F.; a medium temperature zone where the condensing temperature is above 160° F. and below 200° F.; and low temperature zone where the condensing temperature is below 160° F. More condensation will occur in the medium and low temperature zones, the lower the temperature of the heat exchanger surface, the more condensate washing and the lesser the corrosion effect will be; the higher the condensing temperature (above 200° F.), the more aggressive corrosion environment will occur. The heat exchanger elements must be constructed from suitable high corrosion resistant materials, and must be protected by intermittent high pressure water or steam spray nozzle wash systems to clean the heat exchanger surfaces and to effectively reduce the corrosion, and to increase the life cycle of the heat exchanger. The interior of the flue gas cooler enclosure must be protected with corrosion resistant coating or be constructed from corrosion resistant materials. The cooled and dehumidified flue gases flowing from the gas cooler enters the flue gas separator 5, where the gases are separated into two gas streams, a heavier gas fraction; basically an enriched carbon dioxide mixture of gases containing most of the sulfur dioxide and nitrogen oxides, and a lighter gas fraction; basically an enriched nitrogen mixture of gases. The enriched heavier gas fraction enters the gas liquefaction plant 6, where the gas is acted upon by compression, cooling and reverse expansion through a gas expander for a cryogenic process needed for condensing its acidic water vapor, nitrogen oxide, sulfur dioxide, and carbon dioxide, contained therein, each at its corresponding equilibrium partial pressure in the gas mixture. The refrigeration effect of the uncondensed gas stream, and the liquefied gas by-products are further used to provide the cooling required for the process. The reheated uncondensed gases are combined with the lighter gas fraction flowing from the gas separator, and then vented in the cooling tower gas release system 7. The high mass flow rate of the recirculating cooling tower water, and the oxygen rich ambient air in the cooling tower system will permit dissolving most of the trace nitrogen oxides released from the different steps of the process. The cleaned flue gas stream will be mixed with the ambient air and uplifted by the strong draft of the cooling tower for an unembedded disbursement in the atmosphere.

Figure 2:
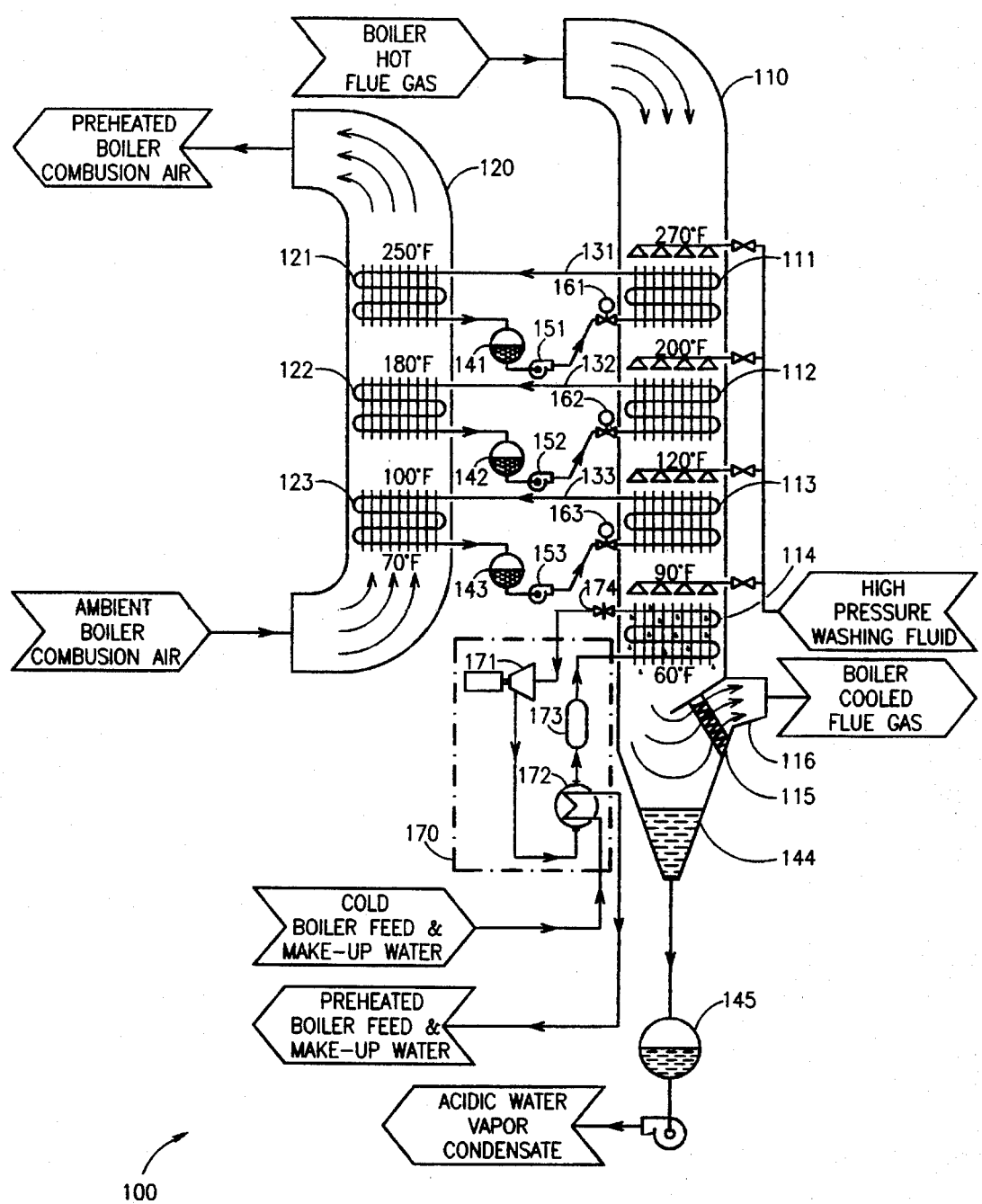
FIG. 2: Is a schematic flow diagram for a reverse heat exchange system for boiler flue gas condensing and combustion air pre-heating.

FIG. 2. indicates a schematic flow diagram for a boiler flue gas cooling and condensing and combustion air pre-heating reverse heat exchange system 100. A boiler flue gas stream is conducted to enter a flue gas cooling and condensing heat exchanger structure 110, and allowed to flow through a first (high temperature) cooling and condensing heat exchanger 111, heat exchanger 111 exchanges heat energy between a first evaporative working fluid (water or alike) operating at boiling and condensing temperature in the range of 220° F. to 500° F. while the flue gases is cooled and part of its hazardous acidic water vapor is condensed on the outside metal surfaces of heat exchanger 111, the first evaporative working fluid inside the pipes of the heat exchanger coil is heated and evaporated to a saturated vapor state, the saturated vapor is conducted via a pipe 131 to a co-operating condenser heat exchanger 121 placed in the combustion air stream pre-heater structure 120. Heat exchanger 121 exchanges heat between the saturated vapor contained inside the heat exchanger pipes and the combustion air stream on the outside. The saturated vapor of the working fluid gives up its latent heat to the combustion air stream, and its condensate is collected in an accumulator tank 141 and returned back by recirculating pump 151 to the evaporator heat exchange 111 to completing the first (high temperature) heat exchanging cycle. The cooled flue gases flowing from the first heat exchanger 111 is then allowed to continue to flow through the outside metal surfaces of a second (medium temperature) cooling and condensing heat exchanger 112. Heat exchange 112 exchanges heat between a second evaporative working fluid (hydrocarbon organic based refrigerant, Freon or alike) operating at a relatively lower boiling and condensing point in the range of 160° F. to 200° F. while the flue gases continue to cool, more of its hazardous acidic water vapor and trace heavy metal vapor condense on the outside metal surfaces of heat exchanger 112, the second evaporative working fluid inside the pipes of the heat exchanger coil is heated and evaporated to a saturated vapor state, the saturated vapor is conducted via a pipe 132 to a co-operating condenser heat exchanger 122. Heat exchanger 122 exchanges heat between the saturated vapor inside the heat exchanger coils and the combustion air stream flowing on the outside metal surface of the condenser coil, the saturated vapor of the second working fluid gives up its latent heat to the combustion air stream, and its condensate is collected in an accumulator tank 142, then returned back by recirculating pump 152 to the evaporator heat exchanger 112 to complete the second (medium temperature) heat exchanging cycle.

The flue gases flowing from the second cooling and condensing heat exchanger 112 then enters a third (low temperature) cooling and condensing heat exchanger 113. Heat exchanger 113 exchanges heat between a third evaporative working fluid (ammonia or alike) operating at relatively lower boiling and condensing point in the range of 100° F. to 160° F. while the flue gases continue to cool and more hazardous acidic water vapor and trace heavy metal vapor condenses on the outside metal surface of the heat exchanger 113, the third evaporative working fluid inside the pipes of the heat exchanger coil is heated and evaporated to a saturated vapor state. The saturated vapor of the third working fluid is then conducted via pipe 133 to a co-operating condenser heat exchanger 123 located in the combustion air pre-heater structure 120. The saturated vapor of the third working fluid condenses at above ambient temperature and gives up its latent heat to the relatively colder combustion air stream entering the combustion air preheater 120, the condensate of the third working fluid is collected in an accumulator tank 143, then returned back by recirculating pump 153 to the evaporator heat exchanger 113 to complete the third (low temperature) heat exchanging cycle.

The flue gases flowing from the third cooling and condensing heat exchanger 113 may be further cooled to a below ambient temperature through a refrigerated cooling and condensing heat exchanger coil 114. Heat exchanger coil 114 an evaporator coil part of a heat pump system 170. Heat pump system 170 employs a refrigerant direct expansion circuit which includes a gas compressor 171, a water cooled condenser 172, a liquid refrigerant accumulator filter 173, and a liquid refrigerant expansion control valve 174. Refrigerant condenser 172 of a shell and tube or plate type heat exchanger is connected to a boiler feed and make up water stream, and is employed for recovering the heat load rejected from the heat pump system.

The continuous flow of relatively cold acidic water vapor-condensation on the outside metal surfaces of the heat exchanger coils, and the high pressure coil washing water are collected into a trough 144 and then drained to tank 145 for proper handling and treatment. The cooled and dehumidified flue gas stream flowing from heat exchanger 114 is then released through a mist eliminator 115 to an outlet 116.

Fluid flow control zone valves 161, 162 and 163 are adopted to provide flow control of the recirculating evaporative working fluids to respond to a preset corresponding temperature range for each of the cooling coils 111, 112 and 113 in the condensing heat exchanger 110, and for a corresponding temperature range for each of the heating coils 121, 122 and 123 in the combustion air stream heat exchanger 120.

Since the hardware and software of process controls are well known and commercially established and available, the process designer can evaluate and select the particular characteristics of the controls required for the maintenance of the process design operating parameters. The general basic features of the temperature, pressure, and mass flow controls are employed to achieve the heat exchanging design limitations.

Depending upon the ambient temperature conditions; approximately 65 to 75% of the acidic water vapor contained in the flue gas stream will condense. The heat recovered by the combustion air stream will contribute to approximately an 8 to 9% reduction in the heat rate of a basic steam power plant heat cycle. Condensation of acidic water vapors contained in the flue gas stream will occur on the metal surfaces of the heat exchangers where the temperatures are below the dew point of the water vapor, even at flue gas temperatures higher than its water vapor dew point, condensation will occur at a relatively colder metal surfaces of the condensing heat exchanger. The number of cooling zones and temperature ranges of the of reversible heat exchangers must be determined to provide the maximum total heat transfer rate between the hot flue gas and the combustion air streams. Evaporative working fluid of the same kind may be employed to operate in more than one heat exchanging circuit at a different pressure setting to maximize the heat transfer rate at selected optimum evaporation and condensating temperatures. Acidic water vapor condensation rates will increase at relatively lower temperature zones, the lower the temperature of the heat exchanger surface, the more water vapor condensate coil washing effect, and the lesser the corrosion will occur. The higher the condensing temperature (above 200° F.), the more aggressive corrosion environment will occur. To effectively reduce the corrosion and to increase the life cycle of the heat exchanger, the heat exchanger elements must be constructed from suitable high corrosion resistant materials, and must be cleaned by intermittent wash cycles, employing high pressure water or steam spray nozzle system. The interior of the flue gas cooler enclosure must be protected by applying corrosion resistant coating or using corrosion resistant materials.

The invented system shall effectively reduce the heat rate of the power plant heat cycle by recovering low temperature heat energy from the gas stream to preheat the combustion air stream and further by recovering heat rejected from a flue gas sub-cooling heat pump system to preheat a stream of boiler feed and make-up water. The following example indicates mass flow and energy information when employing the present invention for a 500 M.W. coal fired power plant.

EXAMPLE

Electric power plant capacity 500 M.W.
Gross heat rate 10,000 BTU/KW
Hours of operation per year 7,000
Coal burned gross heat value 12,800 BTU/LB
Boiler system efficiency 85%
Flue gas mass flow rate $5.5 \times 10^6$ LB/HR
Hot flue gas inlet temperature 270° F.
Sub-cooled flue gas outlet temperature 70° F.
Ambient combustion air flow rate @25% excess air $5.1 \times 10^6$ LB/HR
Ambient combustion air inlet temperature 70° F.
Preheated combustion air exit temperature 220° F.
Sensible heat recovered by combustion air $180 \times 10^6$ BTU/HR
Latent heat recovered by combustion air $86 \times 10^6$ BTU/HR
Heat energy recovered by boiler feed water $144 \times 10^6$ BTU/HR
Total flue gas heat recovered $410 \times 10^6$ BTU/HR
Gross coal heat input reduction @85% eff. $482 \times 10^6$ BTU/HR
Coal heat input to generate electric power required for heat pump $75 \times 10^6$ BTU/HR
Hourly net coal heat input reduction $407 \times 10^6$ BTU/HR
Annual coal heat input reduction 2.85 Trillion BTU
Hourly amount of coal use savings 15.9 tons
Annual amount of coal use savings 111,300 tons
Estimated reduction in power plant energy use 8.1%
Hourly acidic vapors condensed and removed 72.6 tons
Annual acidic vapors condensed and removed 508,200 tons The above information indicates that the present invention will provide substantial decrease in the amount of coal to be burned and substantial removal of acidic vapors otherwise would be emitted into the atmosphere. It should be understood that the indicated mass flow rates, operating temperatures and heat values are only to demonstrate the merits of the present invention, and that the given values are based upon certain particulars which may vary.

What is claimed is:

1. The combination of a reverse heat exchanging system and a heat pump system employing evaporative heat transfer fluids that continuously circulate in closed heat exchanging circuits to cool and condense acidic water vapors contained in a relatively hot flue gas stream flowing from a fossil fueled boiler and to recover heat energy usually emitted into the atmosphere to preheat the boiler combustion air stream and feed water stream, the combination which comprises:

a. a flue gas cooling and condensing heat exchanger enclosure containing a first high temperature flue gas cooling evaporative heat exchanger, a second medium temperature flue gas cooling evaporative heat exchanger, a third (above ambient) low temperature flue gas cooling evaporative heat exchanger, and a fourth (below ambient) low temperature flue gas cooling evaporative heat exchanger, a top inlet to receive said boiler hot flue gas stream, a bottom outlet to release cooled flue gas, a mist eliminator and a bottom outlet to drain acidic water vapor condensate;

b. a combustion air preheater heat exchanger enclosure containing a first low temperature combustion air heating condensing heat exchanger, a second medium temperature combustion air heating condensing heat exchanger and a third high temperature combustion air heating condenser heat exchanger, a bottom inlet to receive a relatively cold combustion air stream from the atmosphere, and a top outlet to release preheated combustion air to said boiler;

c. said first flue gas high temperature cooling evaporator heat exchanger co-operates with said first high temperature combustion air heating condenser heat exchanger employing a first evaporative working fluid that circulates in a first closed loop piping system, a first working fluid circulating pump, and a temperature control system to respond to changes in the mass flow and temperature of the flue gas and combustion air streams passing though said high temperature heat exchangers and to adjust the mass flow rate of said first working fluid to maintain a preset pressure and temperature range of said first working fluid;

d. said second flue gas medium temperature flue gas cooling evaporator heat exchanger co-operates with said second medium temperature combustion air heating condenser heat exchanger employing a second evaporative working fluid that circulates in a second closed loop piping system, a second working fluid circulating pump and a temperature control system to respond to changes in the mass flow and temperature of the flue gas and combustion air streams passing through said medium temperature heat exchangers and to adjust the mass flow rate of said second working fluid to maintain a preset pressure and temperature range of said second working fluid;

e. said third flue gas (above ambient) low temperature cooling evaporator heat exchanger co-operates with said third low temperature combustion air heating condenser heat exchanger employing a third evaporative working fluid that circulates in a third closed loop piping system, a third working fluid circulating pump, and a temperature control system to respond to changes in the mass flow and temperature of the flue gas and combustion air streams passing through said low temperature heat exchangers and to adjust the mass flow rate of said working fluid to maintain a preset pressure and temperature range of said third working fluid;

f. said fourth (below ambient) low temperature flue gas cooling evaporative heat exchanger employs a forth evaporative working fluid that circulates in a fourth piping system connected to a refrigeration gas compressor, a direct expansion valve and co-operates with a heat pump condenser heat exchanger utilized to preheat the boiler feed and make-up water streams.

g. an intermittent heat exchanger coil washing system utilizing high pressure water or steam spray nozzles.

2. The process combination in accordance with claim 1 where a multiple reverse evaporative and condensing heat exchanging steps are employed for a boiler flue gas cooling and condensing of acidic water vapor contained therein, while recovering sensible and latent heat to preheat the boiler combustion air stream and feed water stream, the process which comprises the following steps;

a. receiving and conducting a boiler exhaust flue gas stream at about 270° F. to flow downwardly through a first gas cooling evaporator heat exchanger to exchange heat energy contained therein with a first evaporative working fluid to effect cooling the flue gas stream while heating and evaporating a first working fluid to a saturated state above 200° F.;

b. allowing the flue gas stream flowing from said first evaporator heat exchanger to continue to flow downwardly through a second evaporator heat exchanger and to exchange heat energy contained therein with a second evaporative working fluid to continue cooling the flue gas stream while heating and evaporating a second working fluid to a saturated state above 160° F.;

c. allowing the flue gas stream flowing from said second evaporator heat exchanger to continue to flow downwardly through a third evaporator heat exchanger and to exchange heat energy contained therein with a third evaporative working fluid to continue cooling the flue gas stream while heating and evaporating a third working fluid to a saturated state above 120° F.;

d. allowing the flue gas stream flowing from said third evaporator heat exchanger to continue to flow downwardly through a fourth evaporator heat exchanger and to exchange heat contained therein with a fourth evaporator working fluid of a heat pump refrigeration system to continue cooling and dehumidify the flue gas stream to below the ambient conditions;

e. releasing the already cooled and cleaned flue gas stream flowing from said fourth evaporator heat exchanger;

f. receiving and removing the acidic water vapor condensate flowing from said flue gas cooling structure;

g. receiving and conducting a combustion air stream at ambient temperature and near atmospheric pressure to flow upwardly through said third air heating condenser heat exchanger which co-operates with said third evaporator heat exchanger while the vapor of said third working fluid is cooled and condensed the combustion air is heated to above 120° F.;

h. allowing the combustion air stream flowing from said third air heating condenser heat exchanger to continue to flow upwardly through said second combustion air heating condenser heat exchanger which co-operates with said second evaporator heat exchanger to exchange heat energy with said second evaporative working fluid, while the vapor of said second working fluid is cooled and condensed the combustion air is heated to above 160° F.;

i. allowing the combustion air stream flowing from said second air heating condenser heat exchanger to continue to flow upwardly through said first combustion air heating condenser heat exchanger which co-operates with said first evaporator heat exchanger to exchange heat energy with said first evaporative working fluid, while the vapor of said first working fluid is cooled and condensed, the combustion air is heated to above 200° F.;

j. receiving and conducting the already heated combustion air stream flowing from the third air heating condenser heat exchanger to the boiler combustion air inlet;

k. continuously pumping and adjusting the flow rate and pressure of the condensate of the first evaporative working fluid flowing from the third air heating condenser heat exchanger back to the first flue gas cooling evaporator heat exchanger;

l. continuously pumping and adjusting the flow rate and pressure of the condensate of the second evaporative working fluid flowing from the second air heating condenser heat exchanger back to the second flue gas cooling evaporator heat exchanger;

m. continuously pumping and adjusting the flow rate and pressure of the condensate of the third evaporative working fluid flowing from the first air heating condenser heat exchanger back to the third flue gas cooling evaporator heat exchanger heat exchanger;

n. continuously pumping and adjusting the flow rate and pressure of a refrigerant employed in a direct expansion heat pump system to further sub-cool and dehumidify the boiler flue gas stream flowing from said third flue gas cooling evaporator heat exchanger down to a relatively lower temperature, and to recover the heat energy rejected from said heat pump condenser to preheat a boiler feed and make-up water stream.

3. The combination of claim 2 wherein water is a preferred working fluid for a first evaporator and condenser heat exchanging circuit for fluid evaporating and temperatures above 200° F. and low temperature hydrocarbon organic based refrigerants are preferred working fluids for the second, third and fourth evaporator and condenser heat exchanging circuits for evaporating and temperatures that range from about 160° F. to below ambient temperature.

4. The apparatus according to claim 1 wherein said fossil fueled boiler flue gas reversible heat exchanger subcools and dehumidifies the boiler flue gases to near ambient conditions and recovers sensible and latent heat from the flue gas stream to preheat the boiler combustion air and boiler feed water streams wherein three flue gas cooling evaporative heat exchanger coils placed in a flue gas cooling enclosure are connected to three air heating condensing heat exchanger coils placed in a combustion air preheating enclosure, and one flue gas cooling heat pump evaporative heat exchanger coil placed in the flue gas cooling enclosure is connected to a condenser heat exchanger coil disposed in the boiler feed water preheating system.

* * * * *